United States Patent [19]
Sugimoto et al.

[11] Patent Number: 5,636,716
[45] Date of Patent: Jun. 10, 1997

[54] BICYCLE BRAKE DEVICE

[75] Inventors: Masanori Sugimoto, Osakasayama; Toshiyuki Tanaka, Sakai, both of Japan

[73] Assignee: Shimano, Inc., Osaka, Japan

[21] Appl. No.: 612,453

[22] Filed: Mar. 6, 1996

[30] Foreign Application Priority Data

Mar. 7, 1995 [JP] Japan .................................. 7-047493
Mar. 7, 1995 [JP] Japan .................................. 7-047494

[51] Int. Cl.$^6$ .................................................. B62L 3/00
[52] U.S. Cl. ................................. 188/24.22; 188/24.19
[58] Field of Search ............................. 188/24.11, 24.12, 188/24.14, 24.15, 24.16, 24.19, 24.21, 24.22; 74/105

[56] References Cited

U.S. PATENT DOCUMENTS 3,921,764  11/1975  Mathauser .......................... 188/24.14

FOREIGN PATENT DOCUMENTS

| 438416 | 8/1949 | Italy | 188/24.21 |
|---|---|---|---|
| 446063 | 6/1950 | Italy | 188/24.21 |
| 616123 | 1/1949 | United Kingdom | 188/24.21 |

*Primary Examiner*—Lee W. Young
*Attorney, Agent, or Firm*—James A. Deland

[57] ABSTRACT

Each brake mechanism for a bicycle includes a brake arm having an upper portion and a lower portion, a link member having an upper portion and a lower portion, and a shoe attachment member for attaching a brake shoe thereto. The shoe attachment member is pivotally coupled to the upper portion of the brake arm and to the upper portion of the link member. The lower portion of the brake arm and the lower portion of the link member are adapted to be pivotally mounted to the bicycle so that the lower portion of the brake arm and the lower portion of the link member pivot when a braking force is applied by the cantilever brake apparatus to cause the brake shoe to move toward a wheel rim. The lower portion of the brake arm and the lower portion of the link member are spaced apart from each other for forming a four-bar link mechanism with the shoe attachment member. A link base is provided for attachment to the bicycle frame, wherein the link base includes an attitude maintenance mechanism for maintaining an attachment attitude of the link base relative to the bicycle frame. The link base includes a cylindrical component for fitting about the fixing pin, an engagement component fixed to one end of the cylindrical component, and an arm component fixed to another end of the cylindrical component. The lower portion of the link member is pivotally mounted to the arm component, and the engagement component includes an engagement pin for fitting in an opening formed on the bicycle frame. The shoe attachment member and the brake arm are structured and coupled so that one of the shoe attachment member or brake arm sandwiches the other one of the shoe attachment member or brake arm.

29 Claims, 9 Drawing Sheets

BICYCLE BRAKE DEVICE

BACKGROUND OF THE INVENTION

The present invention is directed to a brake device and, more particularly, to a brake device that is supported by fixing pins which extend from seats provided to the frame of the bicycle, and that is driven by a brake cable so as to press brake shoes against the rim of the wheel.

A cantilever type of brake device is generally mounted on bicycles designed for off road use, such as those called mountain bikes (MTB) and all-terrain bikes (ATB), in order to provide a powerful braking force. A cantilever type of brake device is equipped with brake arms, which are rotatably supported in cantilever fashion on the front or rear fork provided to the front and rear of the bicycle frame, and with brake shoes, which are fixed in the middle of the brake arms. One end of the brake arms is rotatably supported on the frame, and the other end is linked to a brake cable. The brake shoes are arranged opposite one another on either side of the bicycle wheel rim in the middle of the brake arms.

With this cantilever type of bicycle brake device, the brake arms rotate in the closing direction when the brake cable is pulled by the brake lever, and as a result the brake shoes are pressed against the rim and apply a braking force. With such a cantilevered brake device, there is no need to vary the shape of the device with the size of the bicycle, as is the case with a caliper brake device, and this is advantageous in that a more equal braking force is applied on the left and right, rather than the brake working on just one side.

However, when the brake shoes rotate downward from the horizontal plane as a result of the rotation of the brake arms with a cantilevered brake device, the pressing force is diminished if the brake shoes come into contact with the side of the rim without matching up with the slope thereof. Consequently, the relative attachment positions of the rim side surface and the brake device must be adjusted precisely, but this adjustment work is difficult.

A four-link type of brake device is one form of prior art that solves this problem. This four-link type of brake device comprises brake arms which are slidably supported on fixing pins that extend from seats, and the upper ends of which are positioned to the outside of the fixing pins; output links that are rotatably supported in the middle of the brake arms and extend to the outside; follower links that are rotatably linked to the output links and extend downward; and stationary links that are rotatably linked to the follower links and extend to the inside so that they are non-rotatably linked to the fixing pins. The brake shoes are attached to the middle of the output links. With this brake device, when the brake arms are rotated upward by the brake cable, the follower links rotate to the inside, and the output links move horizontally or upwardly. As a result, the brake shoes hit the rim side surface.

With the above-mentioned structure, the frictional force of the bolt threaded into the tip of the fixing pin is utilized to link the stationary link to the fixing pin so that the stationary link does not rotate relative to the fixing pin. Consequently, when a powerful braking force is applied to the brake shoes, the stationary links are sometimes rotated against this friction by reaction force, so the brake shoes escape from the sides of the rim and a sufficient braking force is not obtained. Also, a sufficient braking force sometimes cannot be obtained when the stationary links are caused to rotate by a loose bolt or by chatter.

Furthermore, since the output links to which the brake shoes are attached are linked in cantilever fashion to the brake arms, when a reaction force acts on the brake shoes during braking, the reaction force can cause the linked portion to chatter and twist. When such chatter or twisting occurs, it allows the force that would otherwise be obtained with a four-link system to escape, so a powerful braking force is not obtained.

SUMMARY OF THE INVENTION

The present invention is directed to a cantilever brake mechanism which is rigidly constructed to ensure sufficient braking force under severe conditions. In one embodiment of the present invention, each brake mechanism includes a brake arm having an upper portion and a lower portion, a link member having an upper portion and a lower portion, and a shoe attachment member for attaching a brake shoe thereto. The shoe attachment member is pivotally coupled to the upper portion of the brake arm and to the upper portion of the link member. The lower portion of the brake arm and the lower portion of the link member are adapted to be pivotally mounted to the bicycle so that the lower portion of the brake arm and the lower portion of the link member pivot when a braking force is applied by the cantilever brake apparatus to cause the brake shoe to move toward a wheel rim. The lower portion of the brake arm and the lower portion of the link member are spaced apart from each other for forming a four-bar link mechanism with the shoe attachment member.

In one aspect of the invention, a link base is provided for attachment to the bicycle frame, wherein the link base includes an attitude maintenance mechanism for maintaining an attachment attitude of the link base relative to the bicycle frame. In a specific embodiment, the link base comprises a cylindrical component for fitting about the fixing pin, wherein the brake arm is fitted around the cylindrical component; an engagement component fixed to one end of the cylindrical component; and an arm component fixed to another end of the cylindrical component. In this embodiment, the lower portion of the link member is pivotally mounted to the arm component, and the engagement component includes an engagement pin for fitting in an opening formed on the bicycle frame.

In another aspect of the invention, the shoe attachment member and the brake arm are structured and coupled so that one of the shoe attachment member or brake arm sandwiches the other one of the shoe attachment member or brake arm. That is, in one specific embodiment the shoe attachment member includes a forked arm attachment component and the brake arm is sandwiched between the forked arm attachment component. In another specific embodiment, the brake arm includes a forked attachment component and the shoe attachment member is sandwiched between that forked attachment component.

DETAILED DESCRIPTION OF THE EMBODIMENTS

Figure 1:
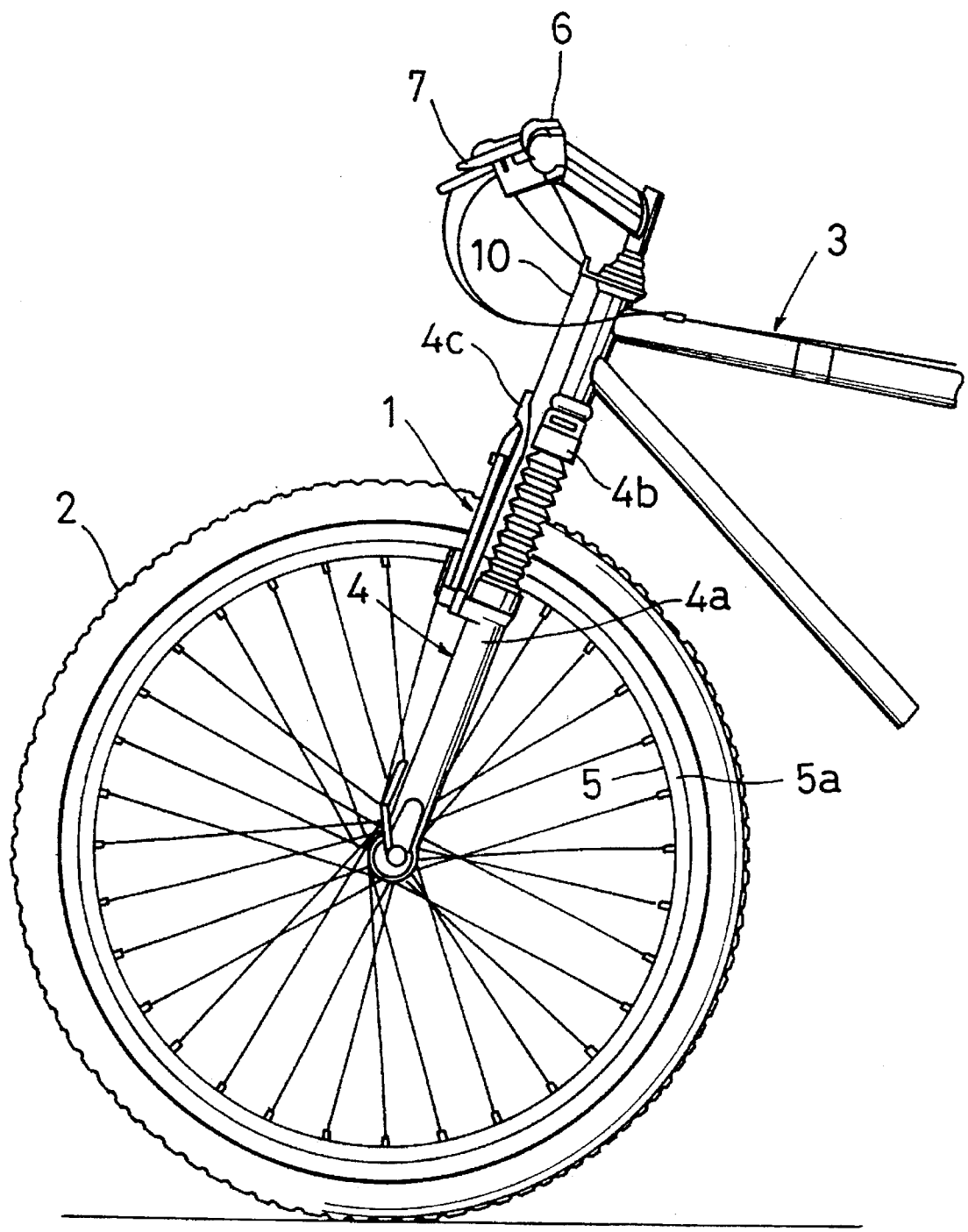
FIG. 1 is a side view of the front portion of a bicycle to which a particular embodiment of the present invention has been applied.
Figure 2:
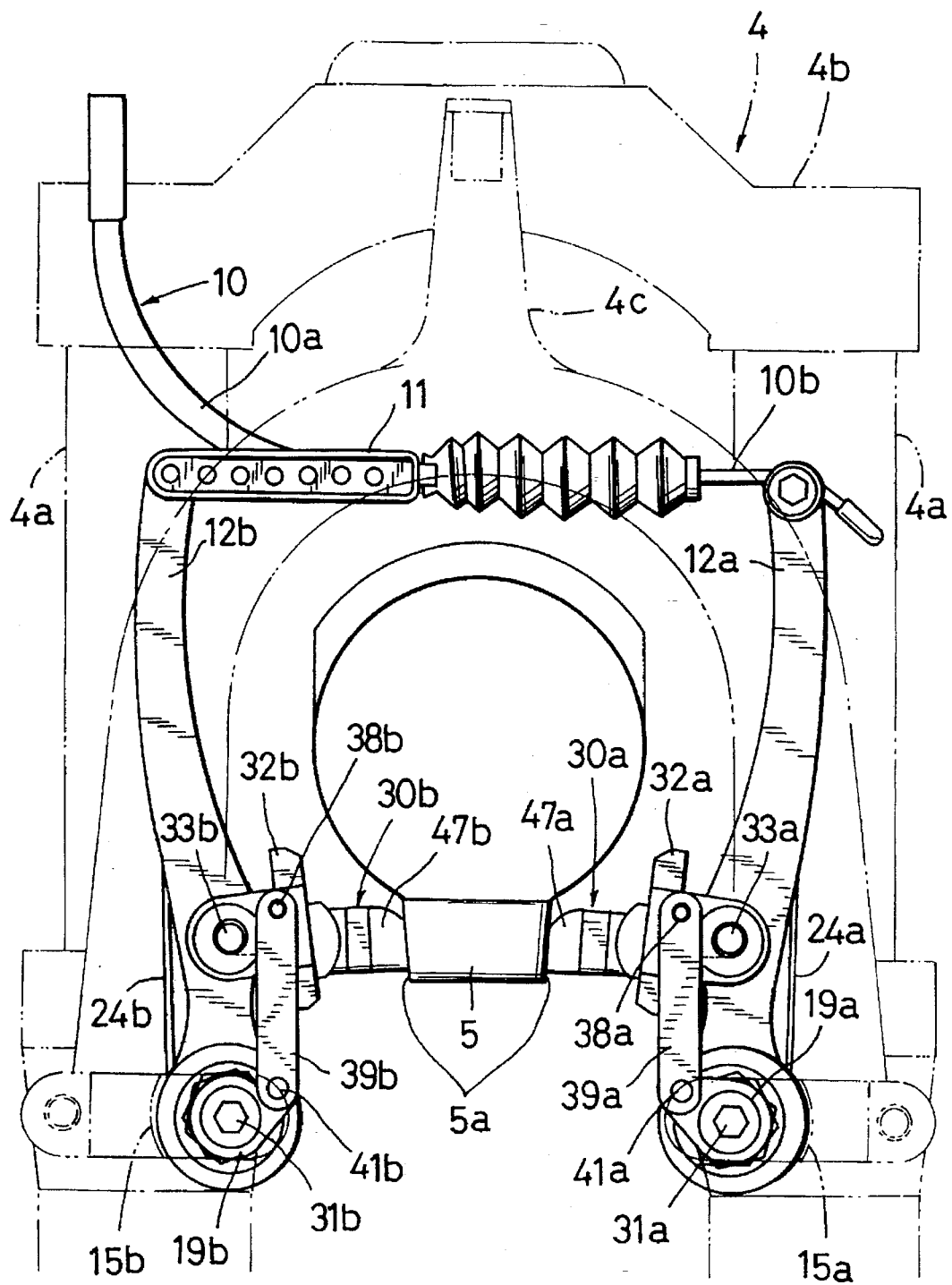
FIG. 2 is a front view of a particular embodiment of a brake device according to the present invention.

In FIGS. 1 and 2, the bicycle brake device 1 in one practical example of the present invention is for use on the from wheel, for example, and exerts a braking force by pressing against both side surfaces 5a of the rim of a front wheel 2. The brake device 1 is rotatably linked to the middle of a front fork 4. The front fork 4 is an air/oil or elastomer type of suspension, for example, and serves to absorb shocks from the road. The front fork 4 has a pair of suspension components 4a, an attachment component 4b to which the pair of suspension components 4a is attached, and a brake arch 4c that is used to reinforce the suspension components 4a. The brake arch 4c is in a roughly inverted U-shape that branches in two, and the lower ends thereof are fixed to the middle of the suspension components 4a.

Figure 4:
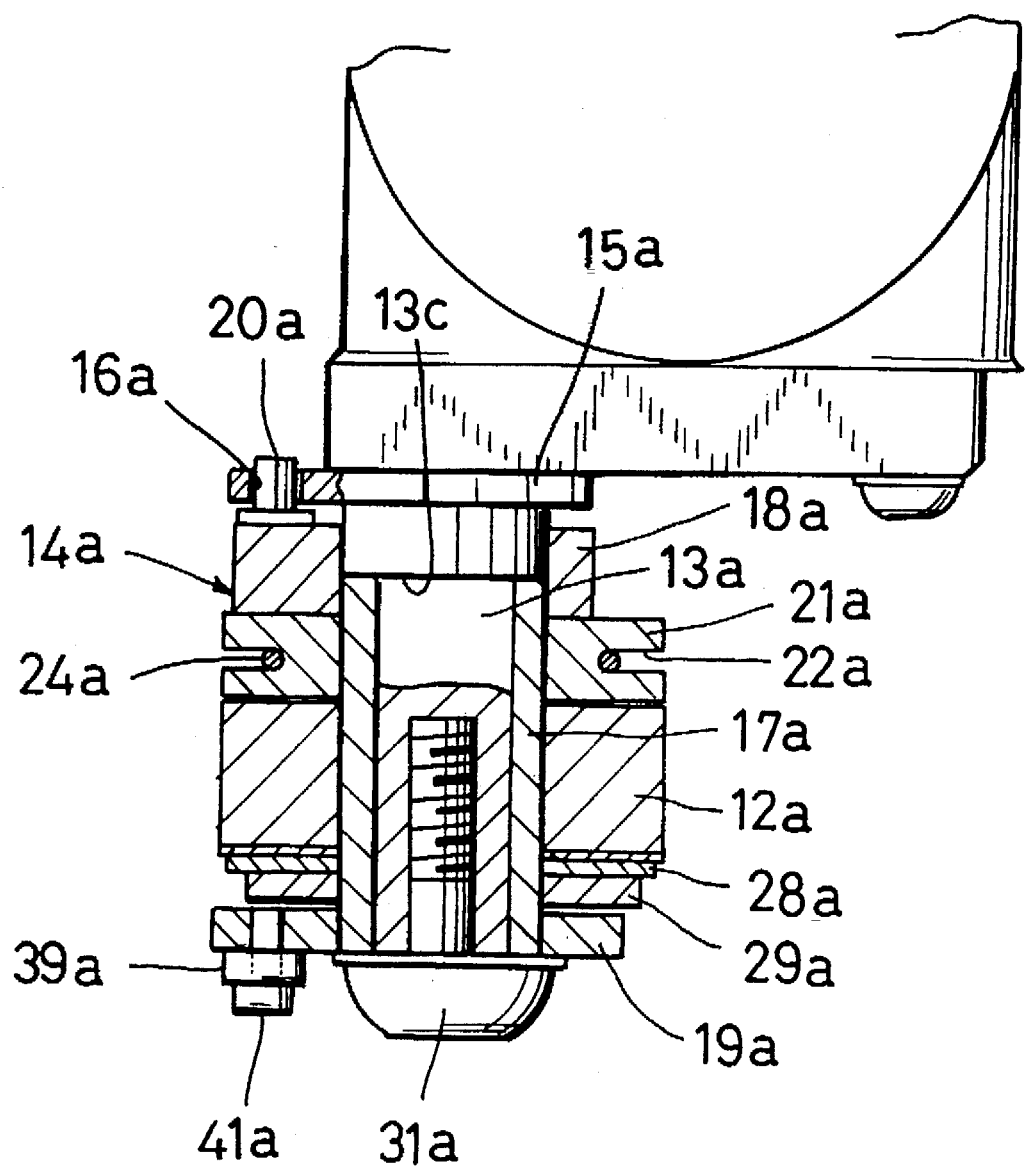
FIG. 4 is a cross sectional view taken along line IV—IV in FIG. 3.

The brake device 1 is linked to the end of a brake cable 10 that extends from a brake lever 7 provided to a handlebar 6. As shown in FIGS. 1 and 2, the brake device 1 has a brake arm 12a that is fixed to the end of the inner cable 10b of the brake cable 10, and a brake arm 12b that is arranged in left-and-right symmetry with the brake arm 12a. To the upper end of the brake arm 12b is rotatably linked a linking arm 11 that is in contact with the outer cable 10a of the brake cable 10 and that extends to the inside. Both brake arms 12a and 12b are in an elongated S-shape that bows in and out from top to bottom. As shown in FIG. 4, the lower ends of the brake arms 12a and 12b are rotatably supported by fixing pins 13a and 13b via link bases 14a and 14b (only 14a is shown in the figure). As used herein, the terms "upper," "lower," "inner," and "outer" are to be determined by reference to FIG. 2.

The members described below, including the fixing pins 13a and 13b, are members in left-and-right symmetry, so only the right-side members in FIG. 2 will be described below, and the description of the left-side members will be omitted.

Figure 3:
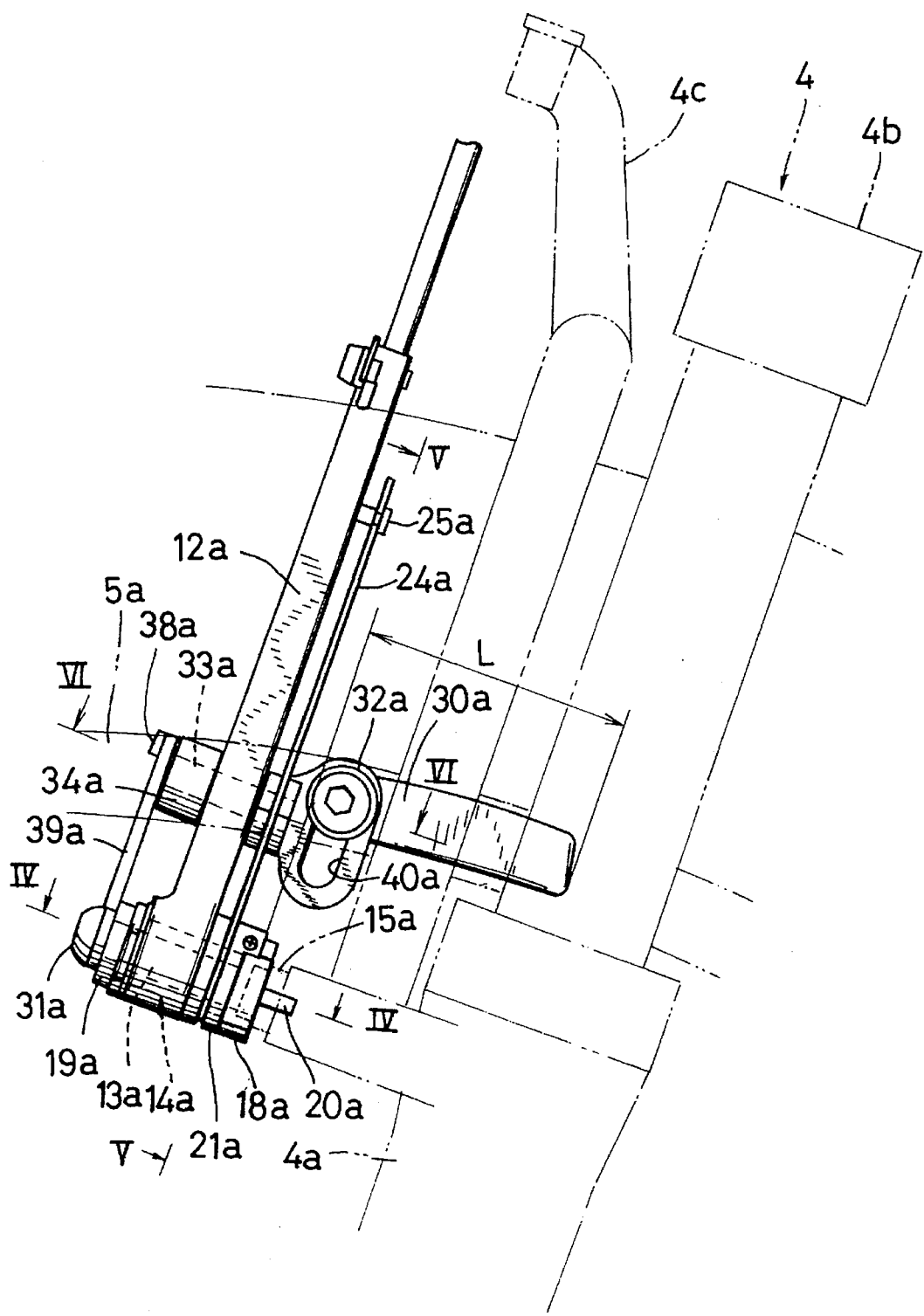
FIG. 3 is a side view of the brake device shown in FIG. 2.
Figure 5:
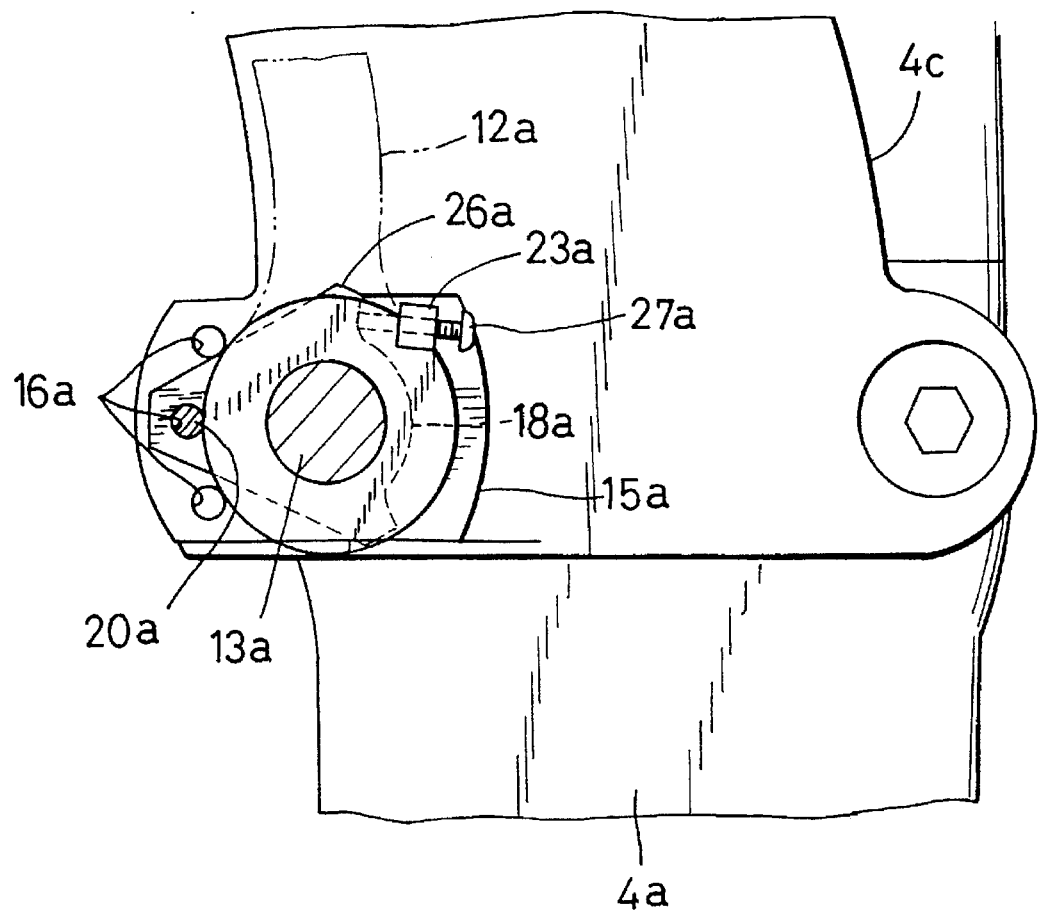
FIG. 5 is a cross sectional view taken along line V—V in FIG. 3.

As shown in FIGS. 3 and 4, the fixing pin 13a is a stepped pin that protrudes forward from a seat 15a provided to the lower inside of the brake arch 4c. As shown in FIG. 5, three support holes 16a are formed vertically at an equal radius around the axis of the fixing pin 13a in the inner surface of the seat 15a. These support holes 16a are used to adjust the strength of the return spring in an ordinary cantilevered brake device.

As shown in FIG. 4, a link base 14a is supported by the fixing pin 13a. The link base 14a has a cylindrical component 17a that is arranged around the outside of the fixing pin 13a and whose base end is in contact with the stepped portion 13c of the fixing pin 13a; an engagement component 18a that is fitted into and fixed around the outside of the base end of the cylindrical component 17a; and a teardrop-shaped arm component 19a that is fitted into and fixed around the outside of the tip. The brake arm 12a is rotatably supported by this cylindrical component 17a. The engagement component 18a is a roughly triangular member, as shown in FIG. 5, and the inner side thereof is provided with an engagement pin 20a that goes through one of the support holes 16a. When this engagement pin 20a is inserted into a support hole 16a, the link base 14a is maintained at the specified attachment attitude.

Around the outside of the link base 14a, a spring holder 21 a is provided between the brake arm 12a and the engagement component 18a. The spring holder 21 a has a groove 22a that is formed in the circumferential direction, and an adjustment component 23a (FIG. 5) that is arranged around the outside. The base end of a return spring 24a is wound and fixed around the inside of the groove 22a. The tip of the return spring 24a extends upward and is engaged by an engagement pin 25a (FIG. 3) that protrudes from the rear surface in the middle portion of the brake arm 12a. The return spring 24a is energized such that the brake arm 12a rotates outward. An adjustment screw 27a that can come into contact with a protrusion 26a formed around the outside of the engagement component 18a is threaded into the adjustment component 23a. The energization of the left and right brake arms 12a and 12b can be adjusted, and the gap between the left and right brake shoes 30a and 30b (discussed below) and the rim side surface 5a can also be adjusted depending on how far in this adjustment screw 27a is threaded.

Around the outside of the link base 14a, a pair of lock nuts 28a and 29a (FIG. 4) are threaded between the brake arm 12a and the arm component 19a. These lock nuts 28a and 29a serve to restrict movement in the axial direction of the brake arm 12a. An attachment bolt 31 a is tightened to the tip of the fixing pin 13a. This attachment bolt 31 a serves to limit movement in the axial direction of the link base 14a.

As shown in FIGS. 2 and 3, a shoe fixing link 32a that is used to attach the brake shoe 30a to the rear of the device 1 is attached roughly horizontally to the middle portion (in the vertical direction) of the brake arm 12a. The shoe fixing link 32a is rotatably linked to the brake arm 12a by an attachment pin 33a that goes through the two.

Figure 6:
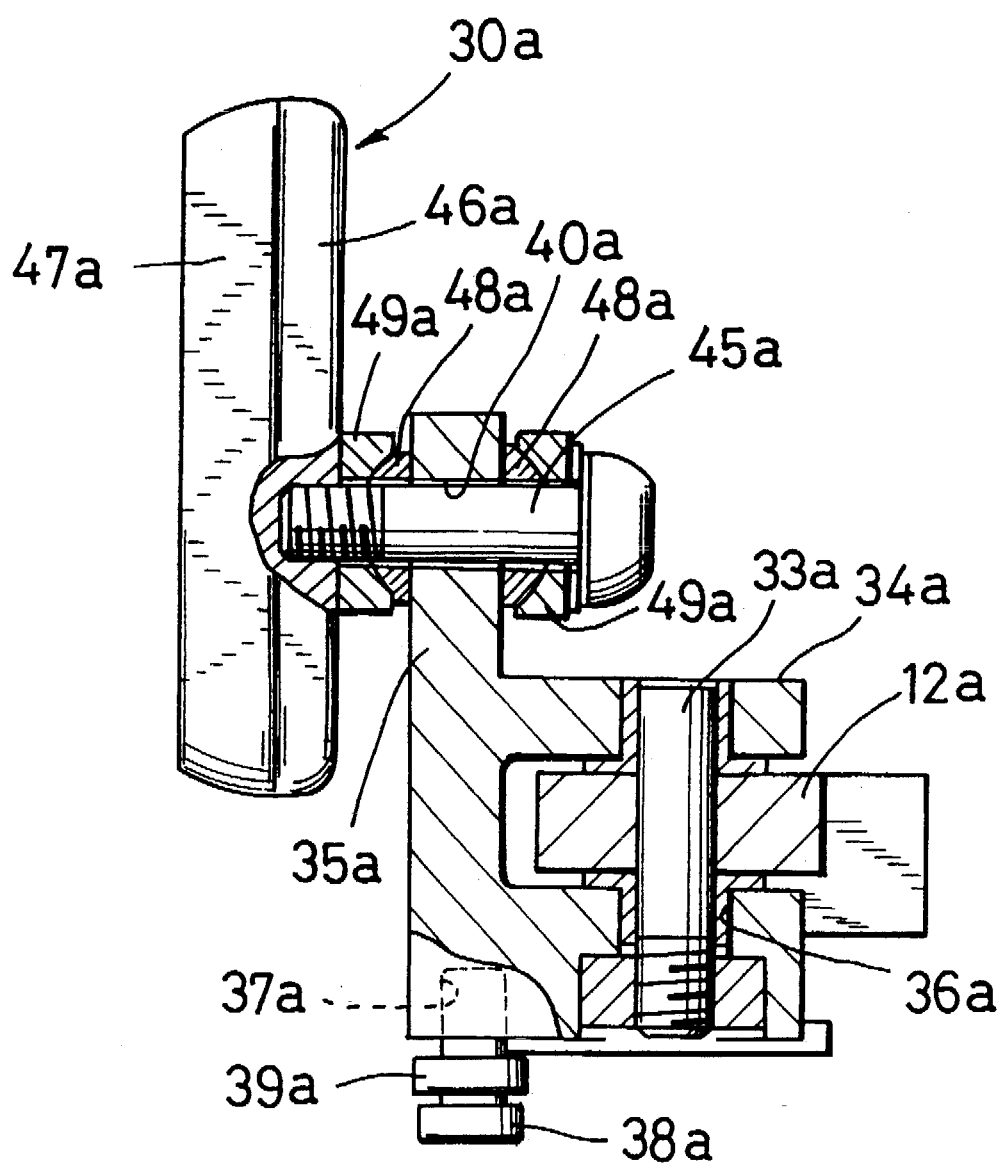
FIG. 6 is a cross sectional view taken along line VI—VI in FIG. 3.

As shown in FIG. 6, the shoe fixing link 32a has an arm attachment component 34a that is formed in a U-shape so as to sandwich both sides of the brake arm 12a, and a shoe attachment component 35a that extends at a right angle from the arm attachment component 34a. In the arm attachment component 34a are formed an attachment hole 36a through which pass two U-shaped pieces used to attach the attachment pin 33a, and a fixing hole 37a that is used to fix a support pin 38a. The support pin 38a serves to rotatably support an auxiliary link 39a (discussed below). When the shoe attachment component 35a and the brake arm 12a are thus linked such that the brake arm 12a is sandwiched, the rigidity of the linked portion is raised and the escape of the brake shoes 30a and 30b can be suppressed. A shoe attachment slot 40a that is longer in the vertical direction (the depth direction of the paper in FIG. 6) is formed in the shoe attachment component 35a. As shown in FIG. 3, this shoe attachment slot 40a is formed such that the distance L between the rear end of the brake shoe 30a and the stepped portion 13c of the fixing pin 13a is at least 25 mm. When the shoe attachment slot 40a is arranged in this position, the braking center approaches the center of the front fork 4, and there is a lower moment produced by reaction force. As a result, the force acting on the front fork 4 is weaker and the rigidity of the brake device is higher.

As shown in FIG. 2, the auxiliary link 39a is a flat member, the upper end of which is rotatably linked to the front surface of the arm attachment component 34a of the shoe fixing link 32a by the support pin 38a. The lower end, as shown in FIGS. 2 and 4, is rotatably linked to the link base 14a by a support pin 41 a attached to the tip of the arm component 19a.

The distance from the axis of the fixing pin 13a to the axis of the support pin 41a is equal to the distance from the axis of the attachment pin 33a to the axis of the support pin 38a. Also, the distance from the axis of the support pin 38a arranged on both sides of the auxiliary link 39a to the axis of the support pin 41 a is equal to the distance from the axis of the fixing pin 13a to the axis of the attachment pin 33a. Specifically, these four pins are arranged such that they form the apexes of a parallelogram, and a linking mechanism is made up of part of the brake arm 12a, the link base 14a, part of the shoe fixing link 32a, and the auxiliary link 39a between these pins. Accordingly, the shoe fixing link 32a moves parallel to a line segment that connects the axis of the fixing pin 13a with the axis of the support pin 41a.

As shown in FIG. 6, the brake shoe 30a is inserted into the shoe attachment slot 40a. The brake shoe 30a has a shoe fixing pin 45a, a shoe holder 46a that is fixed to the tip of the shoe fixing pin 45a, and a rubbing pad 47a made of an elastic material and attached to the shoe holder 46a. The shoe fixing pin 45a is a round-head bolt with a hexagonal hole in it, and a convex washer 48a that has a convex surface forming a partial sphere and a concave washer 49a that has a concave surface which engages with the convex surface are arranged between the round-head and the shoe attachment component 35a, and between the shoe holder 46a and the shoe attachment component 35a. Here, when the brake shoe 30a is tightened inside the slot 40a of the shoe attachment component 35a via the convex washer 48a and the concave washer 49a, the vertical position and slope of the brake shoe 30a can be freely adjusted so as to match up with the position and slope of the side surface 5a of the rim 5.

The operation of the above practical example will now be described.

Figure 7A:
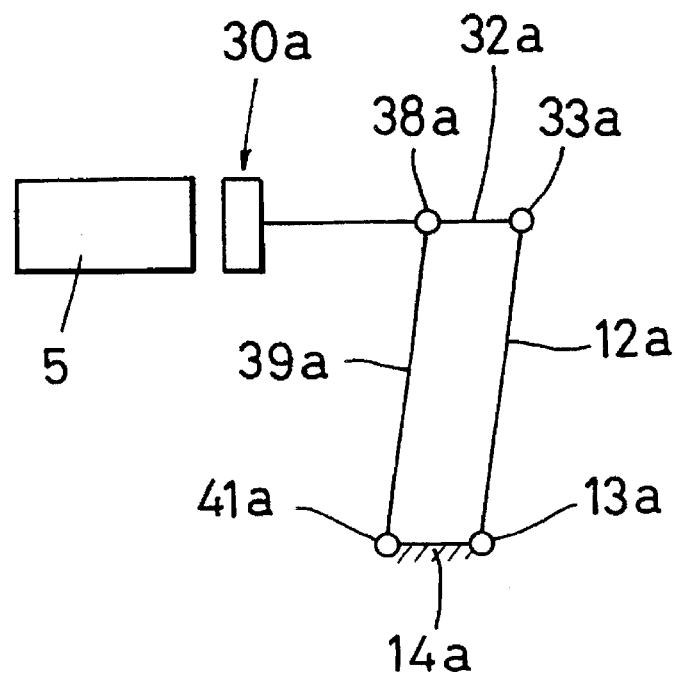
FIGS. 7(A) and 7(B) are schematic views illustrating the operation of the brake device shown in FIG. 2.
Figure 7B:
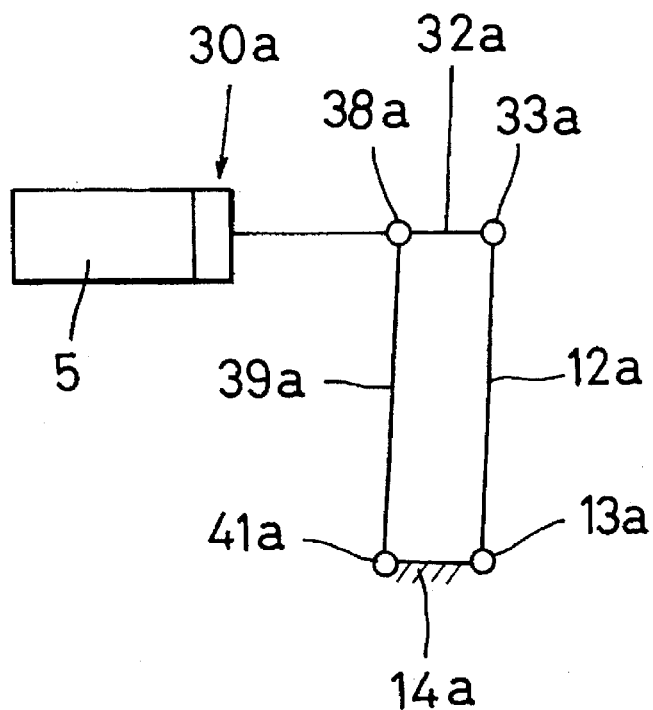

When the rider operates the brake lever 7, the inner cable 10b is pulled through the outer cable 10a, and the upper ends of the brake arms 12a and 12b are pulled inward. As a result, the brake arms 12a and 12b rotate in the closing direction, the rubbing pads 47a and 47b of the brake shoes 30a and 30b press against the side surfaces 5a of the rim, and a braking action is produced. At this time, the shoe fixing links 32a and 32b move to the inside in a state of maintained horizontal attitude as a result of the action of the linking mechanism, including the auxiliary links 39a and 39b. This is shown in FIGS. 7A and 7B. As a result, the rubbing pads 47a and 47b come into proper contact with the rim 5, and a powerful braking force is obtained. Since these auxiliary links 39a and 39b are arranged on the inside of the brake arms 12a and 12b, the dimensions of the brake device 1 in its width direction are compact. As a result, the brake device 1 will not stick out from the front fork 4, for example, and hit the leg, etc., of the rider during operation. Furthermore, even if a reaction force is exerted on the rubbing pads 47a and 47b, the proper attitude of the link bases 14a and 14b will be preserved by the engagement pins 20a and 20b, so sufficient braking force will be obtained.

When the brake lever 7 is released, the brake cable 10 is loosened, the brake arms 12a and 12b are moved in the opening direction by the return springs 24a and 24b, the tips of the rubbing pads 47a and 47b of the brake shoes 30a and 30b move away from the side surfaces 5a of the rim, and braking is released.

Figure 8:
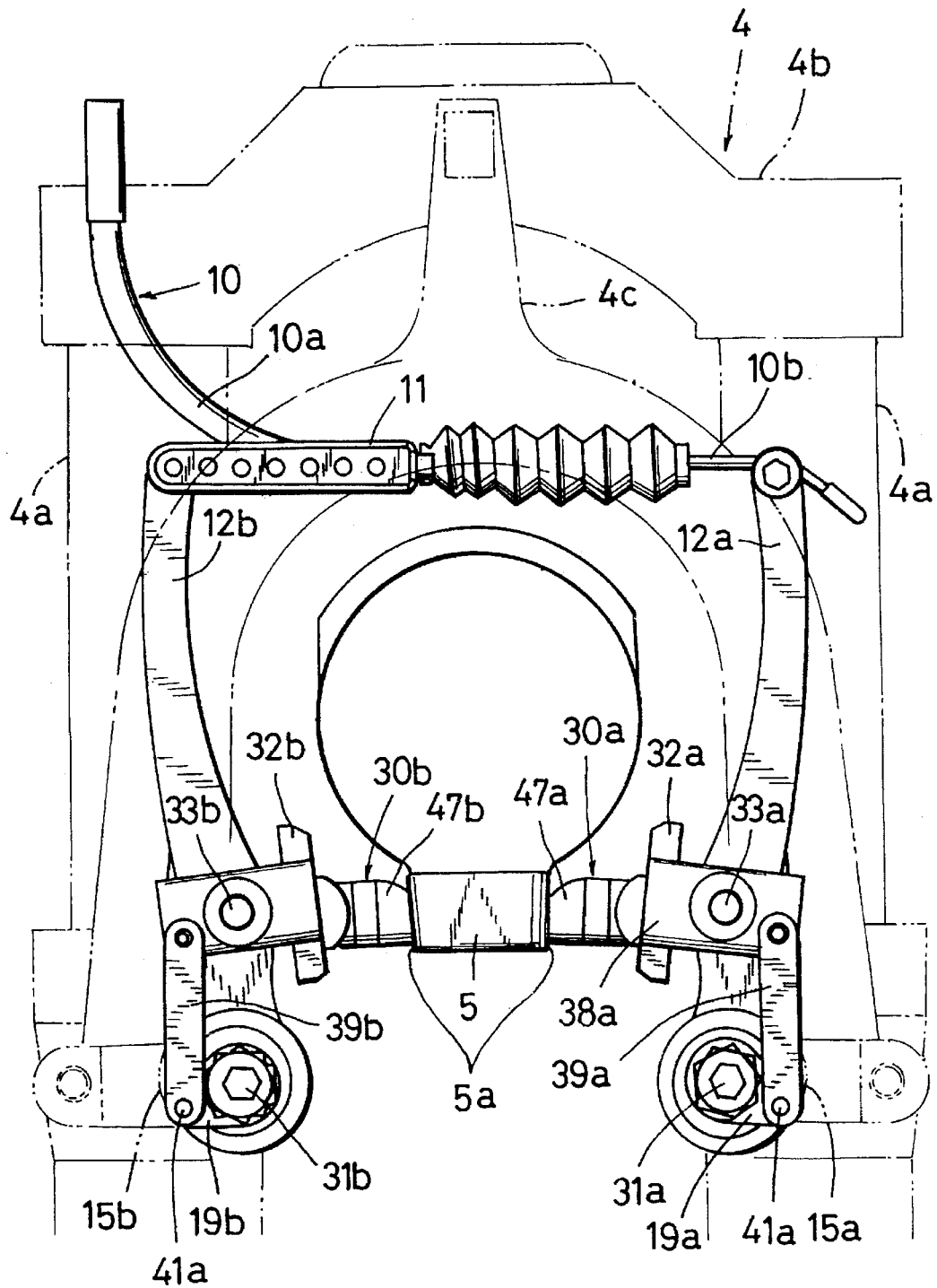
FIG. 8 is a front view of an alternative embodiment of a bicycle brake device according to the present invention.
Figure 9:
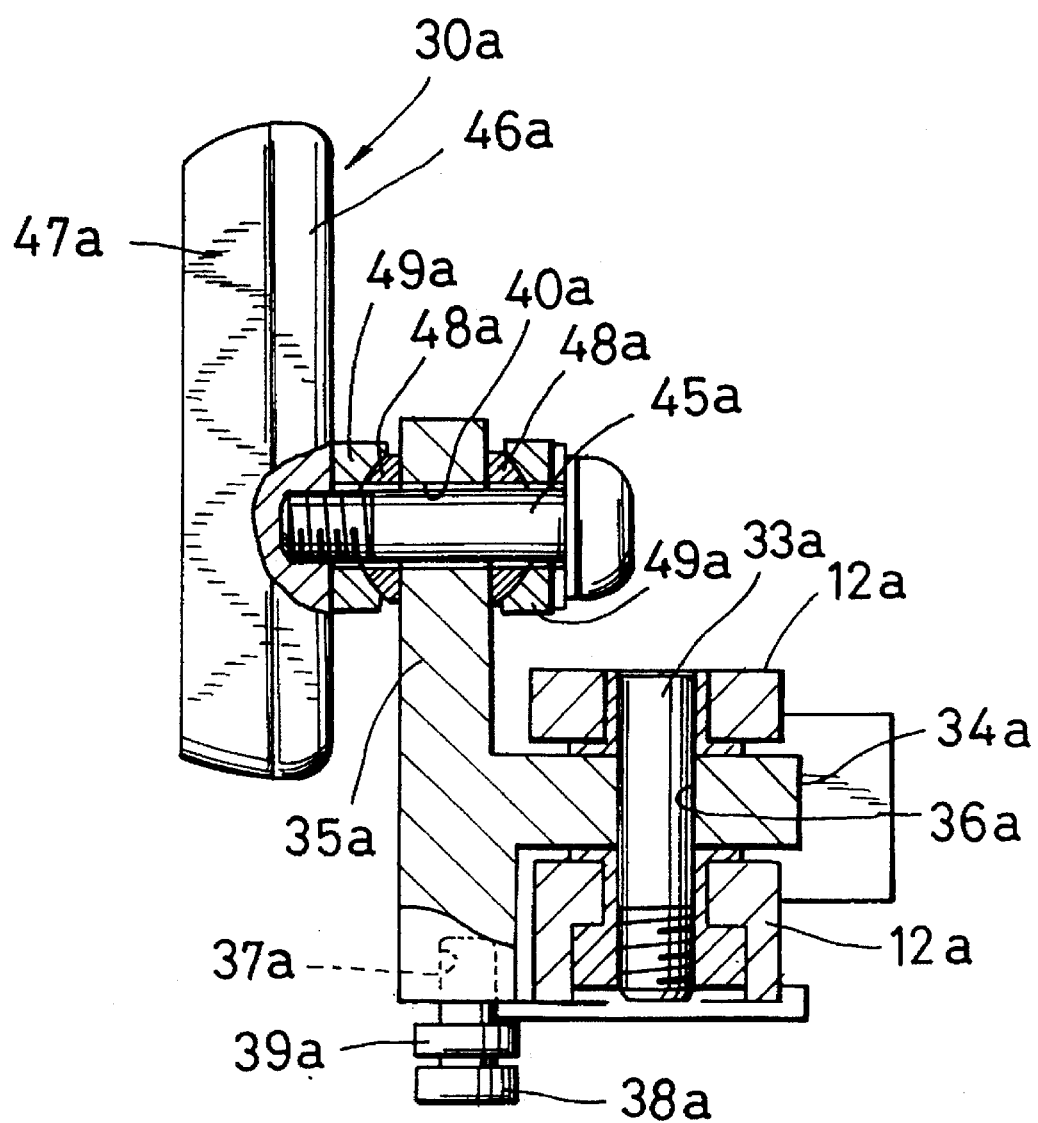
FIG. 9 is a cross sectional view of another alternative embodiment of a bicycle brake device according to the present invention showing the shoe attachment member sandwiched between the brake arm.

While the above is a description of various embodiments of the present invention, further modifications may be employed without departing from the spirit and scope of the present invention. For example, in the above embodiments the brake shoe 30a was located at the rear of the brake device 1, but it may also be located at the front. The auxiliary links 39a and 39b may be located on the inside of the brake arms 12a and 12b, but they may also be located on the outside, as shown in FIG. 8. The four pins may be located at the apexes of a parallelogram, but instead of having them positioned the apexes of a parallelogram, they may each be varied in length such that the tips of the brake shoes 30a and 30b follow along the side surfaces 5a of the rim 5. When the length is thus varied, it allows the shoe fixing links 32a and 32b to move either horizontally or upwardly when the pads are brought into contact with the rim. The brake device 1 may be attached to either the rear fork or the front fork. As shown in FIG. 9, both sides of the shoe fixing link 32a may be sandwiched by the brake arm 12a.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A cantilever brake apparatus for attachment to fixing pins (13a, 13b) which extend from a bicycle frame comprising:

a first brake mechanism and a second brake mechanism, each brake mechanism including:

a brake arm (12a, 12b) having an upper portion and a lower portion;

a link member (39a, 39b) having an upper portion and a lower portion;

a shoe attachment member (32a, 32b) for attaching a brake shoe (30a, 30b) thereto, the shoe attachment member (32a, 32b) being pivotally coupled to the upper portion of the brake arm (12a, 12b) and to the upper portion of the link member (39a, 39b);

wherein the lower portion of the brake arm (12a, 12b) is adapted to be pivotally coupled to the fixing pin (13a, 13b) so that the lower portion of the brake arm (12a, 12b) pivots when a braking force is applied by the cantilever brake apparatus to cause the brake shoe (30a, 30b) to move toward a wheel rim;

a link base (14a) for attachment to the bicycle frame, the link base (14a) including attitude maintenance means (20a) for selectively maintaining an attachment attitude of the link base (14a) relative to the bicycle frame;

wherein the lower portion of the link member (39a, 39b) is adapted to be pivotally coupled to the link base (14a) at an attitude selected by the attitude maintenance means (20a); and wherein the lower portion of the brake arm (12a, 12b) and the lower portion of the link member (39a, 39b) are spaced apart from each other for forming a four-bar link mechanism with the shoe attachment member (32a, 32b), the fixing pin (13a, 13b) and the link base (14a).

2. The apparatus according to claim 1 wherein, in each brake mechanism, the link base (14a) comprises:

a cylindrical component (17a) for attachment to the fixing pin (13a);

an engagement component (18a) attached to one end of the cylindrical component (17a); and an arm component (19a, 19b) attached to another end of the cylindrical component (17a).

3. The apparatus according to claim 2 wherein, in each brake mechanism, the lower portion of the link member (39a, 39b) is pivotally mounted to the arm component (19a, 19b).

4. The apparatus according to claim 2 wherein, in each brake mechanism, the engagement component (18a) includes an engagement pin (20a) for fitting in an opening formed on the bicycle frame.

5. The apparatus according to claim 2 wherein, in each brake mechanism, the brake arm (12a, 12b) is fitted around the cylindrical component (17a).

6. The apparatus according to claim 1 wherein, in each brake mechanism, the link base (14a) comprises:

a cylindrical component (17a) for fitting about the fixing pin (13a), wherein the brake arm (12a, 12b) is fitted around the cylindrical component (17a);

an engagement component (18a) fixed to one end of the cylindrical component (17a);

an arm component (19a) fixed to another end of the cylindrical component (17a); and wherein the lower portion of the link member (39a, 39b) is pivotally mounted to the arm component (19a).

7. The apparatus according to claim 6 wherein, in each brake mechanism, the engagement component (18a) includes an engagement pin (20a) for fitting in an opening formed on the bicycle frame.

8. The apparatus according to claim 7 wherein each brake mechanism further comprises a seat (15a, 15b) for attachment to the bicycle frame in close proximity to the fixing pin (13a, 13b), the seat having a plurality of openings at an equal radius from an axis of the fixing pin (13a, 13b) for receiving the engagement pin (20a) therein.

9. The apparatus according to claim 6 wherein, in each brake mechanism, the brake arm (12a, 12b) is disposed between the engagement component (18a) and the arm component (19a, 19b).

10. The apparatus according to claim 6 wherein, in each brake mechanism, the engagement component (18a) is fitted on an outer peripheral surface of the cylindrical component (17a), and wherein the arm component (19a, 19b) is fitted on the outer peripheral surface of the cylindrical component (17a).

11. The apparatus according to claim 1 wherein, in each brake mechanism, the link member (39a, 39b) is disposed on an inner side of the brake arm (12a, 12b).

12. The apparatus according to claim 1 wherein, in each brake mechanism, the link member (39a, 39b) is disposed on an outer side of the brake arm (12a, 12b).

13. The apparatus according to claim 1 wherein each brake arm (12a, 12b) curves outwardly in a convex shape, and further comprising a cable connecting member (11) connected to one of the brake arms (12a, 12b), wherein the cable connecting member (11) is adapted to be connected to an outer casing (10a) of a brake cable (10), and wherein the other one of the brake arms (12a, 12b) is adapted to connect to an inner cable (10b) of a brake cable (10).

14. The apparatus according to claim 1 wherein, in each brake mechanism, the shoe attachment member (32a, 32b) defines a vertically elongated slot (40a), and further comprising:

a shoe fixing pin (45a) extending through the slot (40a); and a plurality of concave and convex washers (48a, 49a) disposed on the shoe fixing pin (45a) for adjusting an angle of attachment of the shoe fixing pin (45a).

15. The apparatus according to claim 1 wherein the link base (14a) comprises:

an engagement member (20a) for engaging the bicycle frame at a selected attitude;

an link coupling component (19a, 19b) coupled to the engagement member (20a); and wherein the lower portion of the link member (39a, 39b) is coupled to the link coupling component (19a, 19b).

16. The apparatus according to claim 15 wherein the engagement member (20a) comprises an engagement pin.

17. The apparatus according to claim 15 wherein the link base (14a) is adapted to be mounted to the fixing pin (13a).

18. The apparatus according to claim 15 wherein the link base (14a) is adapted to be rotatably mounted to the fixing pin (13a).

19. The apparatus according to claim 15 wherein link coupling component (19a, 19b) comprises an arm component.

20. The apparatus according to claim 15 further comprising a spacer (17a) for spacing the engagement member (20a) and the link coupling component (19a, 19b) apart from each other in a longitudinal direction of the fixing pin (13a).

21. The apparatus according to claim 20 wherein the engagement member (20a) and the link coupling component (19a, 19b) are rigidly connected to the spacer (17a).

22. The apparatus according to claim 21 wherein the spacer (17a) comprises a cylindrical component.

23. The apparatus according to claim 15 wherein the link coupling component (19a, 19b) is coupled to the engagement member (20a) so that the lower portion of the link member (39a, 39b) moves together with the engagement member (20a) when the engagement member (20a) is moved for selecting an attachment attitude.

24. The apparatus according to claim 15 wherein the lower portion of the link member (39a, 39b) is coupled to the link coupling component (19a, 19b) at a fixed position relative to the engagement member (20a).

25. A cantilever brake apparatus for attachment to fixing pins (13a, 13b) which extend from a bicycle frame comprising:

a first brake mechanism and a second brake mechanism, each brake mechanism including:

a brake arm (12a, 12b) having an upper portion and a lower portion;

a link member (39a, 39b) having an upper portion and a lower portion;

a shoe attachment member (32a, 32b) for attaching a brake shoe (30a, 30b) thereto, the shoe attachment member (32a, 32b) being pivotally coupled to the upper portion of the brake arm (12a, 12b) and to the upper portion of the link member (39a, 39b);

wherein the lower portion of the brake arm (12a, 12b) and the lower portion of the link member (39a, 39b) are adapted to be pivotally mounted to the bicycle so that the lower portion of the brake arm (12a, 12b) and the lower portion of the link member (39a, 39b) pivot when a braking force is applied by the cantilever brake apparatus to cause the brake shoe (39a, 39b) to move toward a wheel rim;

wherein the lower portion of the brake arm (12a, 12b) and the lower portion of the link member (39a, 39b) are spaced apart from each other for forming a four-bar link mechanism with the shoe attachment member (32a, 32b) and the bicycle; and wherein the shoe attachment member (32a, 32b) and the brake arm (12a, 12b) are structured and coupled so that one of the shoe attachment member (32a, 32b) or brake arm (12a, 12b) sandwiches the other one of the shoe attachment member (32a, 32b) or brake arm (12a, 12b).

26. The apparatus according to claim 25 wherein, in each brake mechanism, the shoe attachment member (32a, 32b) includes a forked arm attachment component (34a), and wherein the brake arm (12a, 12b) is sandwiched between the forked arm attachment component (34a).

27. The apparatus according to claim 25 wherein, in each brake mechanism, the brake arm (12a, 12b) includes a forked attachment component, and wherein the shoe attachment member (32a, 32b) is sandwiched between the forked attachment component.

28. The apparatus according to claim 25 wherein, in each brake mechanism, the link member (39a, 39b) is disposed on an inner side of the brake arm (12a, 12b).

29. The apparatus according to claim 25 wherein, in each brake mechanism, the link member (39a, 39b) is disposed on an outer side of the brake arm (12a, 12b).

* * * * *